US008805060B2

(12) United States Patent
Kanai

(10) Patent No.: US 8,805,060 B2
(45) Date of Patent: Aug. 12, 2014

(54) COLOR CONVERSION DEVICE, IMAGE OUTPUT DEVICE, AND COLOR CONVERSION METHOD

(75) Inventor: Masashi Kanai, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 1138 days.

(21) Appl. No.: 12/363,350

(22) Filed: Jan. 30, 2009

(65) Prior Publication Data

US 2009/0196494 A1 Aug. 6, 2009

(30) Foreign Application Priority Data

Feb. 1, 2008 (JP) ................................ 2008-022446
Oct. 21, 2008 (JP) ................................ 2008-270611

(51) Int. Cl.
*G06K 9/00* (2006.01)

(52) U.S. Cl.
USPC .......................................... 382/162; 382/167

(58) Field of Classification Search
None
See application file for complete search history.

(56) References Cited

U.S. PATENT DOCUMENTS

| | | | | |
|---|---|---|---|---|
| 6,297,826 | B1 * | 10/2001 | Semba et al. | 345/589 |
| 6,654,494 | B1 * | 11/2003 | Sawada et al. | 382/167 |
| 7,123,380 | B2 * | 10/2006 | Van de Capelle | 358/1.9 |
| 7,372,596 | B2 * | 5/2008 | Tamagawa | 358/1.9 |
| 7,583,420 | B2 * | 9/2009 | Namikata | 358/518 |
| 2003/0231794 | A1 * | 12/2003 | Roberts | 382/167 |
| 2005/0190967 | A1 * | 9/2005 | Ok et al. | 382/167 |
| 2006/0176313 | A1 * | 8/2006 | Xu et al. | 345/603 |
| 2006/0215921 | A1 * | 9/2006 | Yokose et al. | 382/238 |
| 2006/0232803 | A1 | 10/2006 | Hori et al. | |
| 2008/0112611 | A1 * | 5/2008 | Sasaki | 382/162 |

FOREIGN PATENT DOCUMENTS

| | | |
|---|---|---|
| JP | A-2003-274202 | 9/2003 |
| JP | A-2005-269443 | 9/2005 |
| JP | A-2006-303711 | 11/2006 |
| JP | A-2007-251709 | 9/2007 |
| JP | A-2007-288590 | 11/2007 |

* cited by examiner

*Primary Examiner* — Li Liu
(74) *Attorney, Agent, or Firm* — Oliff PLC

(57) ABSTRACT

A color conversion device which converts an image signal in a first color space into an image signal in a second color space corresponding to an image output unit includes: a color conversion table storing unit which stores a color conversion table storing color conversion data used for converting an image signal corresponding to a plurality of lattice points in a third color space having a color range containing the color range of the second color space into the image signal in the second color space; a first color conversion unit which converts the image signal in the first color space into the image signal in the third color space; and a second color conversion unit which converts the image signal in the third color space into the image signal in the second color space based on the color conversion data stored in the color conversion table. The first color conversion unit converts an image signal corresponding to a reference color in the first color space into an image signal corresponding to the lattice points in the third color space.

8 Claims, 10 Drawing Sheets

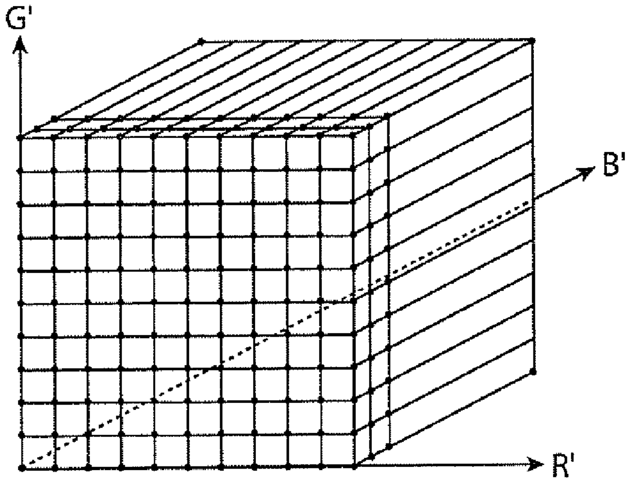
FIG. 5A
| | |
|---|---|
| (R',G',B') | (R,G,B) |
| (R',G',B') | (R,G,B) |
| ⋮ | ⋮ |
FIG. 5B
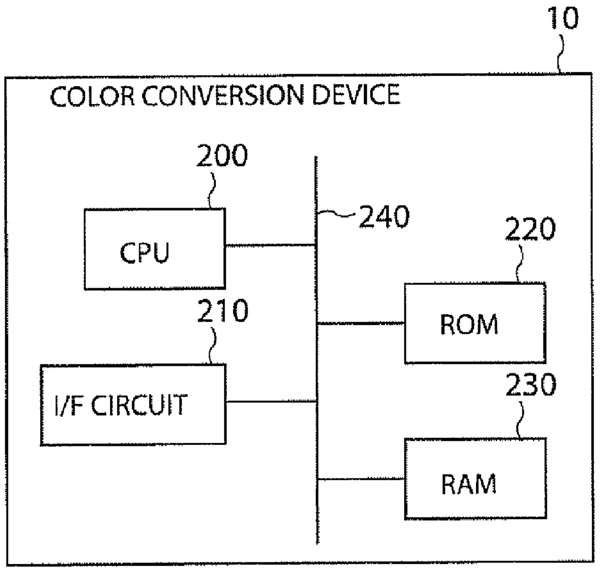
FIG. 6

COLOR CONVERSION DEVICE, IMAGE OUTPUT DEVICE, AND COLOR CONVERSION METHOD

CROSS-REFERENCE TO RELATED APPLICATIONS

This application claims priority to JP2008-022446 filed Feb. 1, 2008 and JP2008-270611 filed Oct. 21, 2008, both filed in Japan, the disclosures of which is hereby incorporated by reference in their entirety.

BACKGROUND

1. Technical Field

The present invention relates to a color conversion device, an image output device, and a color conversion method.

2. Related Art

A color range (color reproducibility range) of an image output device in related art such as an image display apparatus including display device and projector and a printing device including color printer is not sufficiently wide for representing color of an existing object due to the limitation that the color range is determined by the characteristics of fluorescent material contained in CRT (cathode ray tube), or for other reasons. On the other hand, with development of color reproducibility technology, a new type of image output device having expanded color range has been available on the market, and color spaces having expanded color range have been already used for processing still images and dynamic images.

Thus, for meeting the demand for color space standards (color signal standards) capable of dealing with wider color range, various wide color range standards such as xvYCC (IEC61966-2-4) have been established. Particularly the xvYCC color space has much wider color range than those of sRGB color space capable of representing standard color range space of the image display apparatus and AdobeRGB color space and NTSC (national television standards committee) color space having wider color range than that of the sRGB color space. Thus, the xvYCC color space can theoretically represent so-called imaginary color and colors not used in practical representation.

Since image signals for representing an image are specified by various types of color space standards, there is a possibility that the color range of image signals on the image input device side is different from the color range of image signals on the image output device side. In this case, color conversion process is performed for the image signals generated from the image input device side so that color reproducibility can be secured according to the color space standards on the image output device side.

JP-A-2007-251709 discloses this type of color conversion device for performing the color conversion process. According to the technology disclosed in this reference, for conversion from YCC signal in luminance color difference system into RGB signal in display signal system, YCC signal is converted into RGB signal by matrix calculation before execution of color conversion with reference to RGB color control LUT (look up table) so as to increase utilization efficiency of RGB color control LUT.

Also, JP-A-2007-288590 discloses a technology which converts input color signals in color space dependent on input device into signals in color space independent of the input device, converts the color signals as converted signals in the color space independent of the input device into color signals in virtual input color space containing color reproducibility range of a general input device, and converts the color signals as converted signals in the virtual input color space into color signals in color space dependent on an output device by using CLUT.

According to the technology disclosed in JP-A-2007-251709, color conversion is performed using the RGB color control LUT. Thus, accuracy of the color conversion process decreases when the number of lattice points of LUT is small. In this case, the number of lattice points of LUT needs to be increased for accurate color conversion, which raises cost.

According to the technology disclosed in JP-A-2007-288590, the maximum saturation point in the virtual input color space is so determined as to coincide with the lattice point of CLUT. However, the maximum saturation point in the input color space is not so determined as to coincide with the lattice point of CLUT during conversion from input device dependent color space into input device independent color space and conversion from input device independent color space into virtual input color space. Thus, error is caused by interpolation calculation for the maximum saturation point of input color space.

SUMMARY

It is an advantage of some aspects of the invention to provide a color conversion device, an image output device, and a color conversion method capable of performing color conversion of an image signal in a wide color range space as accurately as possible at low cost.

A color conversion device which converts an image signal in a first color space into an image signal in a second color space corresponding to an image output unit according to a first aspect of the invention includes: a color conversion table storing unit which stores a color conversion table storing color conversion data used for converting an image signal corresponding to a plurality of lattice points in a third color space having a color range containing the color range of the second color space into the image signal in the second color space; a first color conversion unit which converts the image signal in the first color space into the image signal in the third color space; and a second color conversion unit which converts the image signal in the third color space into the image signal in the second color space based on the color conversion data stored in the color conversion table. The first color conversion unit converts an image signal corresponding to a reference color in the first color space into an image signal corresponding to the lattice points in the third color space.

According to this structure, the second color conversion unit capable of converting the image signal without lowering accuracy of the image signal in the third color space corresponding to the reference color in the first color space converts the image signal in the third color space into the image signal in the second color space after the first color conversion unit converts the image signal in the first color space into the image signal in the third color space having the color range containing the color range of the second color space. Thus, small-scale and accurate color conversion can be achieved even when an image signal in a wide-range color space is inputted.

According to this structure, the image signal in the first color space is converted into the image signal in the third color space such that the image signal in the first color space corresponding to the reference color can be converted into the image signal at the lattice points in the third color space, and the image signal in the third color space is converted into the image signal in the second color space by the second color conversion unit based on the color conversion data stored in the color conversion table. Thus, accurate color conversion can be performed for the reference color even when the color conversion table contains a small volume of data.

It is preferable that the first color conversion unit converts the image signal in the first color space into the image signal in the third color space by matrix calculation using color conversion matrix.

According to this structure, the image signal in the first color space can be converted into the image signal in the third color space without decrease in accuracy in the first color conversion unit. Thus, accuracy of small-scale color conversion for an image signal in a wide-range color space is not lowered.

It is preferable to further include a color conversion matrix producing unit which produces the color conversion matrix. In this case, the color conversion matrix producing unit selects the image signal corresponding to the reference color stored in the color conversion table, and produces the color conversion matrix such that the color range of the selected image signal contains the color range of the second color space.

According to this structure, the color conversion device can perform small-scale and accurate color conversion by the simple structure according to the characteristics of an image display unit even when an image signal in a wide-range color space is inputted.

It is preferable that the color conversion matrix producing unit repeats selection of the image signal corresponding to the reference color stored in the color conversion table and production of the color conversion matrix until the color range of the selected image signal contains the color range of the second color space.

According to this structure, the color conversion device can perform small-scale and accurate color conversion even when an image signal in a wide-range color space is inputted.

It is preferable that the reference color is a primary color in the first color space.

According to this structure, the color conversion device can achieve high color reproducibility of primary color in the first color space frequently used with higher possibility at low cost.

An image output device according to a second aspect of the invention includes: the color conversion device described above; and an image output unit which outputs an image according to an image signal after color conversion process performed by the color conversion device.

According to this structure, the image output device can perform color conversion of an image signal in a wide-range color space as accurately as possible at low cost.

A color conversion method which converts an image signal in a first color space into an image signal in a second color space corresponding to an image output unit according to a third aspect of the invention includes: a first color conversion step which converts the image signal in the first color space into an image signal in a third color space having a color range containing the color range of the second color space; and a second color conversion step which converts the image signal in the third color space into the image signal in the second color space based on a color conversion data stored in a color conversion table used for converting the image signal corresponding to a plurality of lattice points in the third color space into the image signal in the second color space. The first color conversion step converts an image signal corresponding to a reference color in the first color space into an image signal corresponding to the lattice points in the third color space.

According to this method, the color conversion method can perform color conversion of an image signal in a wide-range color space as accurately as possible at low cost.

BRIEF DESCRIPTION OF THE DRAWINGS

The invention will be described with reference to the accompanying drawings, wherein like numbers reference like elements.

FIGS. 5A and 5B illustrate color conversion table according to this embodiment.

FIG. 6 is a block diagram showing a hardware structure example of the color conversion device shown in FIG. 1.

DESCRIPTION OF EXEMPLARY EMBODIMENTS

An exemplary embodiment according to the invention is hereinafter described with reference to the drawings. The scope of the invention as claimed in the appended claims is not limited to the embodiment described and depicted herein for any unjustified reason. In addition, all of the parts and components discussed herein are not necessarily required for providing advantages of the invention.

1. Color Conversion Device

Figure 1:
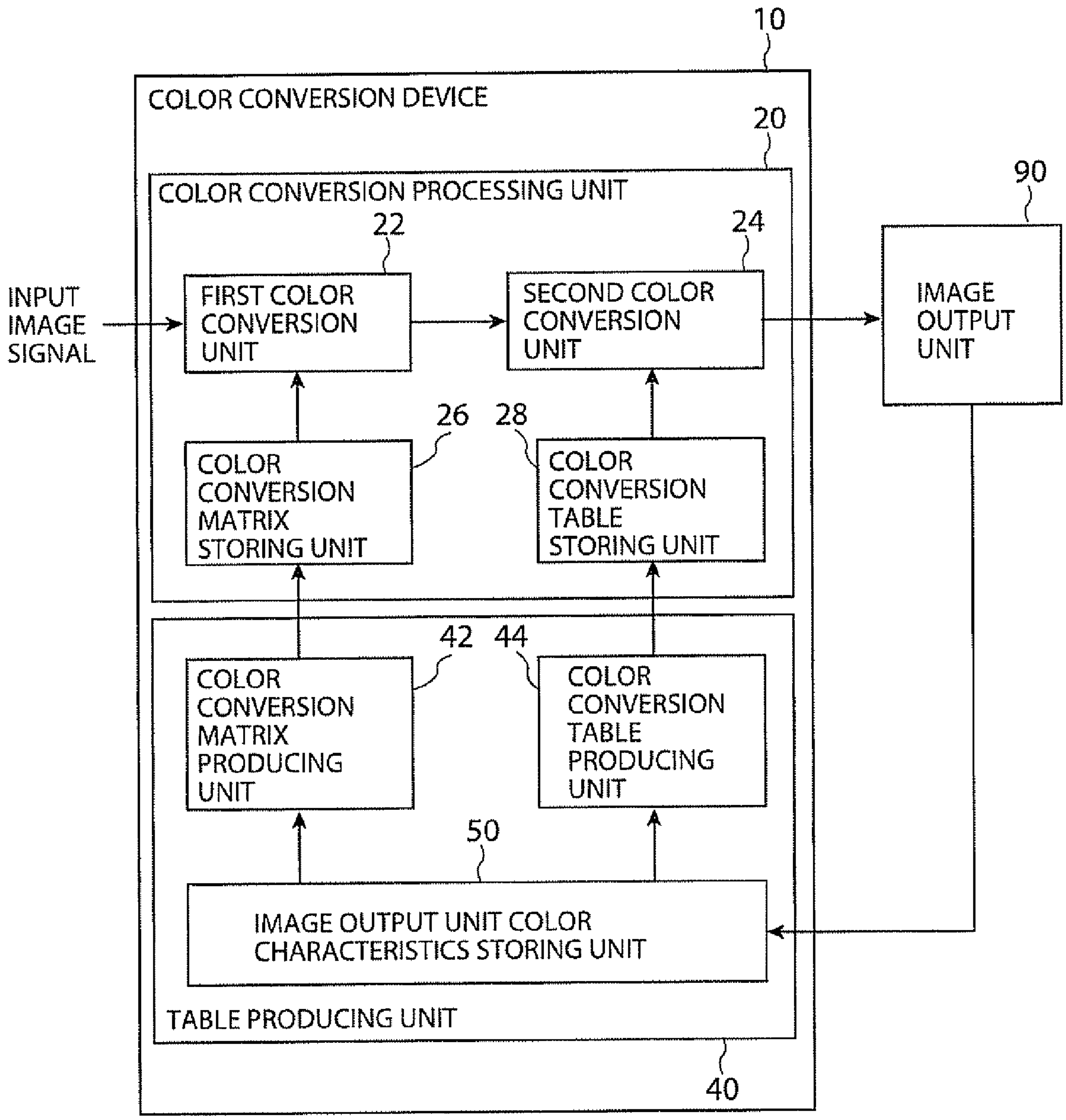
FIG. 1 is a block diagram showing a structure example of a color conversion device according to an embodiment of the invention.

FIG. 1 is a block diagram showing a structure example of a color conversion device according to the embodiment of the invention. A color conversion device 10 in this embodiment performs color conversion process for an input image signal (image signal) generated from a not-shown image signal generating device (image input device in a wide sense), and outputs the image signal after color conversion process to an image output unit 90. The image output unit 90 outputs an image corresponding to the image signal received from the color conversion device 10. In this step, the color conversion device 10 converts an image signal in a first color space into an image signal in a second color space corresponding to the image output unit 90 (image output device), and outputs the image signal after conversion to the image output unit 90.

The color conversion device 10 having this function includes a color conversion processing unit 20. The color conversion processing unit 20 has a first color conversion unit 22 and a second color conversion unit 24. The first color conversion unit 22 converts an input image signal (image signal) in the first color space received from the image signal generating device (not shown) into an image signal in a third color space having a color range containing the color range of the second color space. The second color conversion unit 24 converts the image signal in the third color space after color conversion by the first color conversion unit 22 into an image signal in the second color space.

Figure 2:
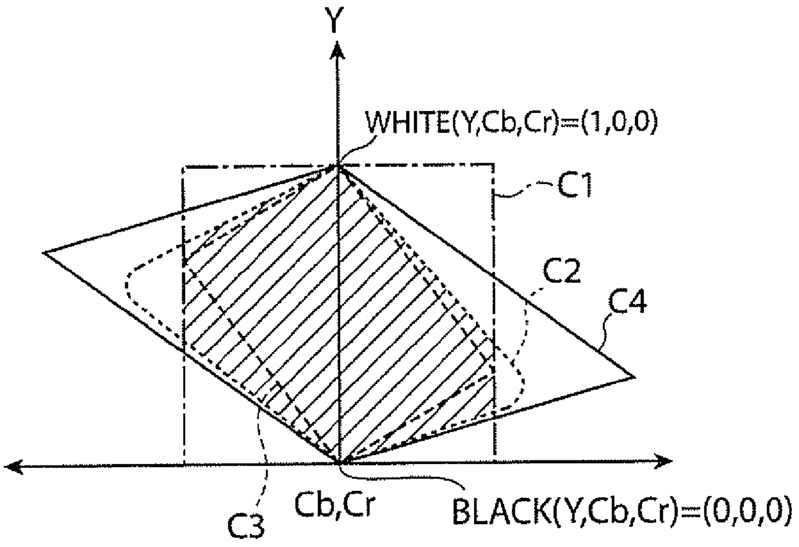
FIG. 2 illustrates a color space of an image signal according to this embodiment.

FIG. 2 illustrates the color space of the image signal according to this embodiment. In FIG. 2, the vertical axis represents Y signal as luminance component, the horizontal axis represents Cb signal and Cr signal as color difference components.

In this embodiment, the first color space contains colors such as sYCC color space and xvYCC color space other than sRGB color space, and a YCC signal as a luminance and color different system image signal in this color space is inputted to the color conversion device 10. The second color space contains color range which can be reproduced by the image output unit 90, and an RGB signal in this color space is supplied to the image output unit 90. The third color space is a wide-range RGB color space wider than the color space reproducible by the image output unit 90, for example, and has a color range containing the color range of the second color space.

Thus, when general conversion from YCC to RGB defined in ITU-R BT. 709 or the like is performed for a color range C1 of the YCC signal as an input image signal in the first color space in FIG. 2, the RGB signal after the conversion obtains a color range C3 which is narrower than a color range C2 of the image output unit 90. Thus, the color range to be displayed by the image output unit 90 becomes narrower than the original color range C2, and thus the entire color range of the YCC signal cannot be displayed.

To overcome this problem, a color range C4 of an image signal in the wide-range RGB color space of the third color space (hereinafter referred to as wide-range RGB signal) is provided in this embodiment, and the first color conversion unit 22 converts the YCC signal as the input image signal into the wide-range RGB signal in the color range C4. Then, the second color conversion unit 24 converts the wide-range RGB signal in the color range C4 into an RGB signal in the color range C2. By this method, the color range as the shaded portion in FIG. 2 becomes a color range to be displayed by the image output unit 90, and the YCC signal (YCbCr signal) within this range becomes a signal to be displayed by the image output unit 90.

Since this color conversion process is a non-linear conversion, conversion process of image signals is performed with reference to color conversion data prepared as a table. The color conversion data thus prepared is discrete data, and a great number of lattice points need to be provided in the color conversion table for storing lattice points in the third color space so as to achieve color conversion with high accuracy. As a result, the data volume of the color conversion data to be prepared becomes extremely large.

In this embodiment, therefore, the first color conversion unit 22 converts the image signal in the first color space with one-to-one correspondence and outputs the image signal in the third color space without lowering accuracy of the image signal so as to perform color conversion process with high accuracy in a smallest possible scale (smallest data volume). Then, the second color conversion unit 24 converts the image signal in the third color space into the image signal in the second color space and outputs the image signal allowing decrease in accuracy of a part of the image signal. More specifically, the second color conversion unit 24 converts the image signal in the third color space into the image signal in the second color space without lowering accuracy of the image signal in the third color space in correspondence with the reference color of the first color space.

The process performed by the first color conversion unit 22 is achieved by using matrix calculation for image signal conversion, for example. Also, the process performed by the second color conversion unit 24 is achieved by interpolation using color conversion table as necessary for image signal conversion, for example.

More specifically, the second color conversion unit 24 converts the image signal in the third color space corresponding to the reference color in the first color space into the image signal in the second color space without executing interpolation, and performs interpolation to convert the image signal in the third color space corresponding to colors other than the reference color into the image signal in the second color space. The reference color is a primary color used frequently and requiring high color conversion accuracy (such as primary color of sRGB) contained in the colors in the first color space, for example.

Figure 3:
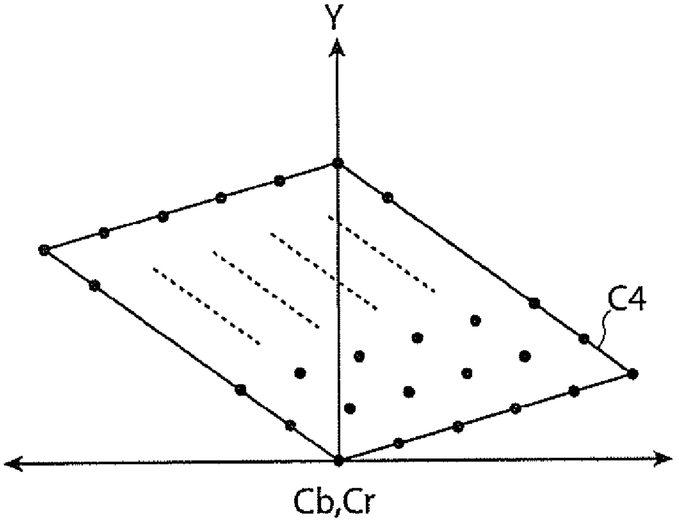
FIG. 3 illustrates color conversion data according to this embodiment.

FIG. 3 illustrates color conversion data according to this embodiment. In FIG. 3, the vertical axis represents Y signal as luminance component, the horizontal axis represents Cb signal and Cr signal as color difference components. Similar reference numbers are given to parts similar to those in FIG. 2, and the same explanation is not repeated.

As can be seen from FIG. 3, the color conversion data is set at respective lattice points provided discretely so as to cover the whole color range C4. The color conversion table used by the second color conversion unit 24 is a color conversion data group provided for each of the lattice points, and color conversion data for converting the image signal in the second color space corresponding to the image signal in the third color space is stored in the lattice points of the table. Thus, the image signals not positioned at the lattice points are color-converted based on the color conversion data calculated by known interpolation using color conversion data provided at the nearby lattice points.

As discussed above, the image signal in the third color space corresponding to the reference color in the first color space is converted into the image signal in the second color space without interpolation. Thus, such color conversion table is prepared in advance which stores the color conversion data used to convert the image signal corresponding to the plural lattice points in the third color space which has the color range containing the color range of the second color space into the image signal in the second color space, and the first color conversion unit 22 converts the image signal in the first color space into the image signal in the third color space. Also, the first color conversion unit 22 converts the image signal corresponding to the reference color in the first color space into the image signal corresponding to the lattice points in the third color space. Then, the second color conversion unit 24 converts the image signal in the third color space into the image signal in the second color space based on the color conversion data stored in the color conversion table.

By this method, the second color conversion unit 24 converts the image signal obtained without decrease in accuracy in the third color space having a wider color range than the color range of the image output unit 90 into the image signal in the second color space. Thus, the second color conversion unit 24 can perform color conversion process with higher accuracy even when the YCC signal containing color other than sRGB such as sYCC and xvYCC is inputted. In addition, since interpolation is not necessary for color conversion of the reference color which is frequently used, accurate color conversion can be achieved even when the data volume of the color conversion data stored in the color conversion table is small.

As shown in FIG. 1, the color conversion device 10 having this structure further includes a table producing unit 40, and the color conversion processing unit 20 further includes a color conversion matrix storing unit 26 and a color conversion table storing unit 28. The table producing unit 40 has a color conversion matrix producing unit 42, a color conversion table producing unit 44, and an image output unit color characteristics storing unit 50.

The table producing unit 40 produces color conversion matrix used by the first color conversion unit 22 for performing color conversion process using the color conversion processing unit 20 in correspondence with the color range of the image output unit 90, and produces color conversion table used by the second color conversion unit 24. The image output unit color characteristics storing unit 50 stores the color characteristics data of the image output unit 90. The color characteristics data is data such as measurement data of the image outputted from the image output unit 90 and measured by, for example, a light measuring sensor as a color measuring unit contained in the color conversion device 10, or color characteristics data contained in the image output unit 90.

The color conversion matrix producing unit 42 produces color conversion matrix using the color characteristics data stored in the image output unit color characteristics storing unit 50. The color conversion matrix produced by the color conversion matrix producing unit 42 is stored in the color conversion matrix storing unit 26. The first color conversion unit 22 performs color conversion process using the color conversion matrix stored in the color conversion matrix storing unit 26.

Figure 4:
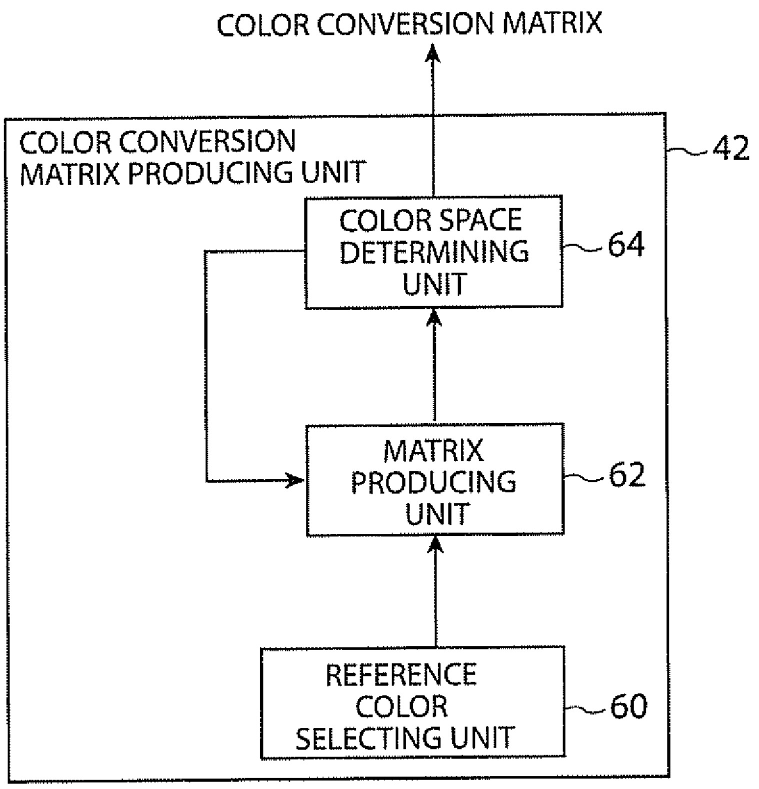
FIG. 4 is a block diagram showing a structure example of a color conversion matrix producing unit shown in FIG. 1.

FIG. 4 is a block diagram showing a structure example of the color conversion matrix producing unit 42 shown in FIG. 1.

The color conversion matrix producing unit 42 includes a reference color selecting unit 60, a matrix producing unit 62, and a color space determining unit 64. The reference color selecting unit 60 selects colors frequently used and requiring high color conversion accuracy in the colors in the first color space. In this embodiment, the reference color selecting unit 60 selects primary colors (such as primary colors of sRGB). The matrix producing unit 62 produces color conversion matrix used for converting the image signal corresponding to the primary color selected by the reference color selecting unit 60 into the image signal at the lattice point in the third color space. The color space determining unit 64 determines whether the color range of the wide-range RGB signal converted by the color conversion matrix produced by the matrix producing unit 62 contains the color range of the image output unit 90. The matrix producing unit 62 repeatedly produces color conversion matrix until the color space determining unit 64 determines that the color range of the wide-range RGB signal converted by the color conversion matrix produced by the matrix producing unit 62 contains the color range of the image output unit 90.

As shown in FIG. 1, the color conversion table producing unit 44 produces color conversion table using the color characteristics data stored in the image output unit color characteristics storing unit 50. The color conversion table produced by the color conversion table producing unit 44 is stored in the color conversion table storing unit 28. The second color conversion unit 24 performs color conversion process using the color conversion table stored in the color conversion table storing unit 28.

FIGS. 5A and 5B illustrate color conversion table according to this embodiment. FIG. 5A shows color conversion table used for converting the wide-range RGB signal into RGB signal. In FIG. 5A, R component signal, G component signal, and B component signal of the wide-range RGB signal are represented as R' signal, G' signal, and B' signal, respectively. FIG. 5B shows color conversion table in this embodiment.

The second color conversion unit 24 receives wide-range RGB signal and outputs RGB signal corresponding to the wide-range RGB signal. In this step, the lattice point of the wide-range RGB signal in the color space is stored at the lattice point of the color conversion table to output the RGB signal corresponding to the inputted wide-range RGB signal using the color conversion data at the corresponding lattice point. More specifically, a combination (R, G, B) of R signal, G signal, and B signal is outputted to a lattice point defined by a combination (R', G', B') of R' signal, G' signal, and B' signal discretely provided on the color conversion table as shown in FIG. 5A. Thus, a color conversion data group of lattice points shown in FIG. 5B is stored in the color conversion table storing unit 28 as color conversion table, for example.

When the wide-range RGB signal at the lattice point shown in FIGS. 5A and 5B is given, the second color conversion unit 24 outputs the RGB signal stored in correspondence with the wide-range RGB signal. Thus, the image signal in the third color space corresponding to the reference color in the first color space can be converted into the image signal in the second color space without requiring interpolation of this image signal in the third color space. When the wide-range RGB signal not positioned at the lattice point is given, the second color conversion unit 24 outputs the RGB signal calculated by known interpolation method using the RGB signal stored at the lattice point near this wide-range RGB signal.

According to the example shown in FIG. 1, the color conversion device 10 includes the color conversion processing unit 20 and the table producing unit 40. However, the table producing unit 40 may be disposed outside the color conversion device 10.

A process example performed by the color conversion device 10 in this embodiment is now described.

FIG. 6 is a block diagram showing a hardware structure example of the color conversion device 10 shown in FIG. 1.

The color conversion device 10 includes a CPU 200, an I/F circuit 210, a read only memory (ROM) 220, a random access memory (RAM) 230, and a bus 240. The CPU 200, the I/F circuit 210, the ROM 220, and the RAM 230 are electrically connected with one another via the bus 240.

For example, the ROM 220 stores a program for performing the function of the color conversion device 10. The CPU 200 reads the program stored in the ROM 220 and executes processes according to the program to provide the function of the color conversion device 10 discussed above by software processing. The RAM 230 is used as an operation area of the processes performed by the CPU 200, or buffer areas of the I/F circuit 210 and the ROM 220. The RAM 230 stores the color conversion matrix and the color conversion table. The I/F circuit 210 performs input interface processing for image signals inputted from the not-shown image signal generating device.

The functions of the first color conversion unit 22, the second color conversion unit 24, the color conversion matrix producing unit 42, and the color conversion table producing unit 44 shown in FIG. 1 are provided by the CPU 200 which reads and executes the program stored in the ROM 220. The functions of the color conversion matrix storing unit 26, the color conversion table storing unit 28, and the image output unit color characteristics storing unit 50 shown in FIG. 1 are provided by the ROM 230.

Figure 7:
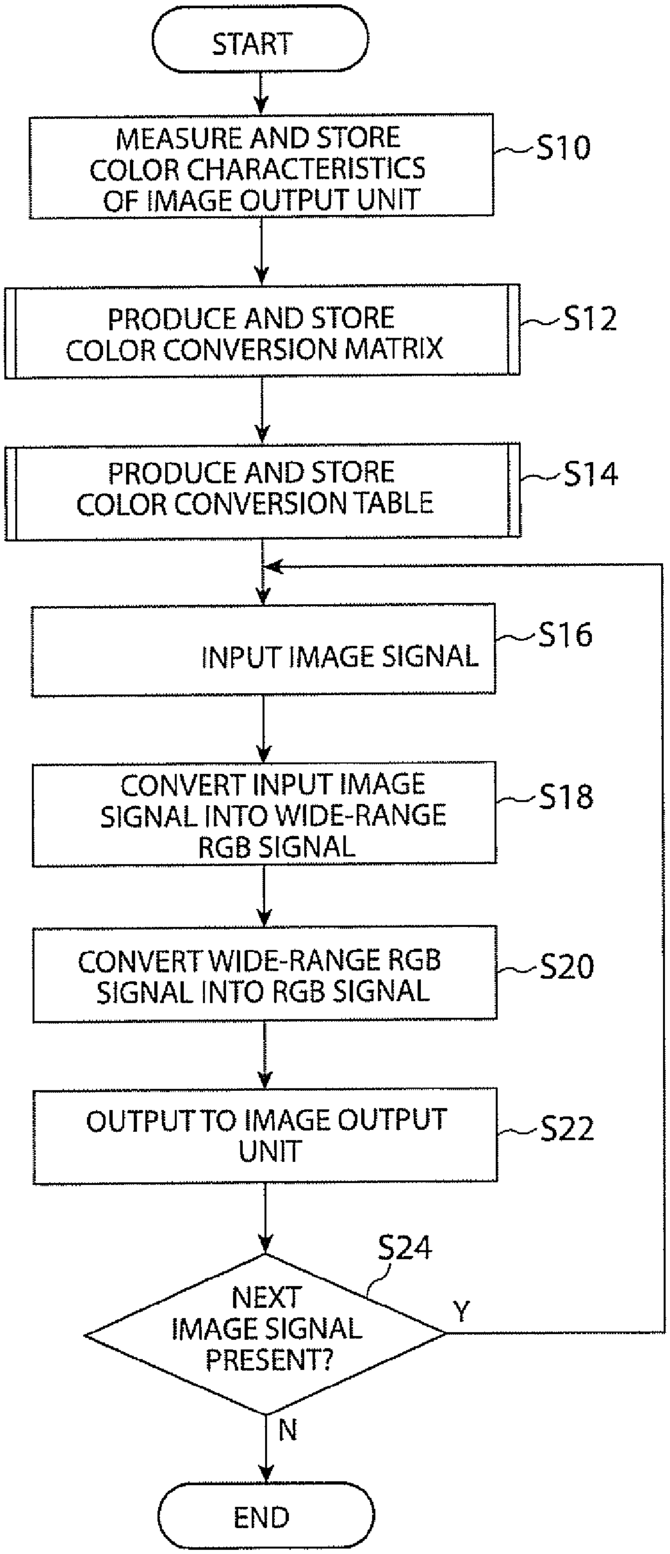
FIG. 7 is a flowchart showing a process example performed by the color conversion device shown in FIG. 1.

FIG. 7 is a flowchart showing the process example performed by the color conversion device 10 shown in FIG. 1.

The ROM 220 shown in FIG. 6 stores a program for performing the process shown in FIG. 7 in advance. The CPU 200 reads the program stored in the ROM 220 and performs the process according to the program so as to execute the process shown in FIG. 7 by software processing.

Initially, the color conversion device 10 measures color characteristics data of the image output unit 90 by a measuring unit such as a light measuring sensor or other color measuring unit, and stores the color characteristics data in the image output unit color characteristics storing unit 50 in a color measuring step (step S10). In this case, the color characteristics data is three stimulus value (X, Y, Z) of output light according to CIE 1931 color specification system (CIE 1931 standard calorimetric system, XYZ color specification system) when a measuring image signal is inputted to the image output unit 90. The color to be measured is a color necessary for obtaining the measuring image signal for displaying the color desired to be displayed by the image output unit 90 from the three stimulus value X, Y, and Z of the corresponding color. Thus, only the color necessary for obtaining the three stimulus value (R, G, B) in the RGB color specification system from the three stimulus value (X, Y, Z) in the XYZ color specification system needs to be measured as will be described later. According to this embodiment, at least respective primary colors of the image output unit 90 are measured.

Then, the color conversion device 10 produces color conversion matrix used for converting the YCC signal as an input image signal into the wide-range RGB signal by the color conversion matrix producing unit 42, and stores the produced color conversion matrix in the color conversion matrix storing unit 26 in a color conversion matrix producing step (step S12). More specifically, the color characteristics data read from the image output unit color characteristics storing unit 50 and coordinates at a lattice point contained in the color conversion table (such as fixed value) are inputted to the color conversion matrix producing unit 42 to produce the color conversion matrix for defining the wide-range RGB signal such that the reference color of the input image signal (primary color of sRGB) can be converted into the coordinates of the lattice point in the color conversion table referred to by the second color conversion unit 24 (lattice point in the color space of the wide-range RGB signal). The color conversion matrix produced by the color conversion matrix producing unit 42 is stored in the color conversion matrix storing unit 26.

Next, the color conversion device 10 produces the color conversion table for converting the wide-range RGB signal into the RGB signal for the image output unit 90 by the color conversion table producing unit 44 and stores the produced color conversion table in the color conversion table storing unit 28 in a color conversion table producing step (step S14). More specifically, the color characteristics data read from the image output unit color characteristics storing unit 50 and coordinates at a lattice point contained in the color conversion table (such as fixed value) are inputted to the color conversion table producing unit 44 to produce the color conversion table for converting the wide-range RGB signal into the RGB signal. The color conversion table produced by the color conversion table producing unit 44 is stored in the color conversion table storing unit 28.

The steps S10, S12, and S14 discussed above are performed only once in the initializing sequence immediately after supply of power source to the color conversion device 10. After these steps are once performed, the color conversion device 10 carries out color conversion process for the image signal from the not-shown image signal generating device using the color conversion matrix produced in step S12 and the color conversion table produced in step S14.

Then, the color conversion device 10 receives the input image signal from the not-shown image signal generating device (step S16). After receiving the input image signal, the color conversion device 10 converts the input image signal into the wide-range RGB signal by the first color conversion unit 22 using the color conversion matrix read from the color conversion matrix storing unit 26 in a first color conversion step (step S18). In this embodiment, the input image signal is converted into the wide-range RGB signal without lowering accuracy of any input image signal through matrix calculation using the color conversion matrix. In this case, the image signal corresponding to the reference color of the input image signal is converted into the wide-range RGB signal corresponding to the coordinates at the lattice point in the color conversion table referred to by the second color conversion unit 24.

Next, the color conversion device 10 converts the wide-range RGB signal converted by the first color conversion unit 22 into the RGB signal for the image output unit 90 using the color conversion data read from the color conversion table storing unit 28 by the second color conversion unit 24 in a second color conversion step (step S20). In this embodiment, the image signals corresponding to the colors for the number of lattice points containing the reference color are converted into the lattice points in the color space of the wide-range RGB signal. Thus, the image signals corresponding to the colors for the number of lattice points containing the reference color are accurately color-converted without interpolation of the color conversion data in the color conversion table. However, image signals corresponding to other colors are color-converted through interpolation of the color conversion data in the color conversion table.

Subsequently, the color conversion device 10 outputs the RGB signal converted by the second color conversion unit 24 to the image output unit 90 (step S22). Thereafter, it is determined whether the next image signal from the not-shown image signal generating device is present or not (step S24). When it is determined that the next image signal is present (step S24: Y), the process returns to step S16. When it is determined that the next image signal is not present (step S24: N), a series of the processing ends (end).

Figure 8:
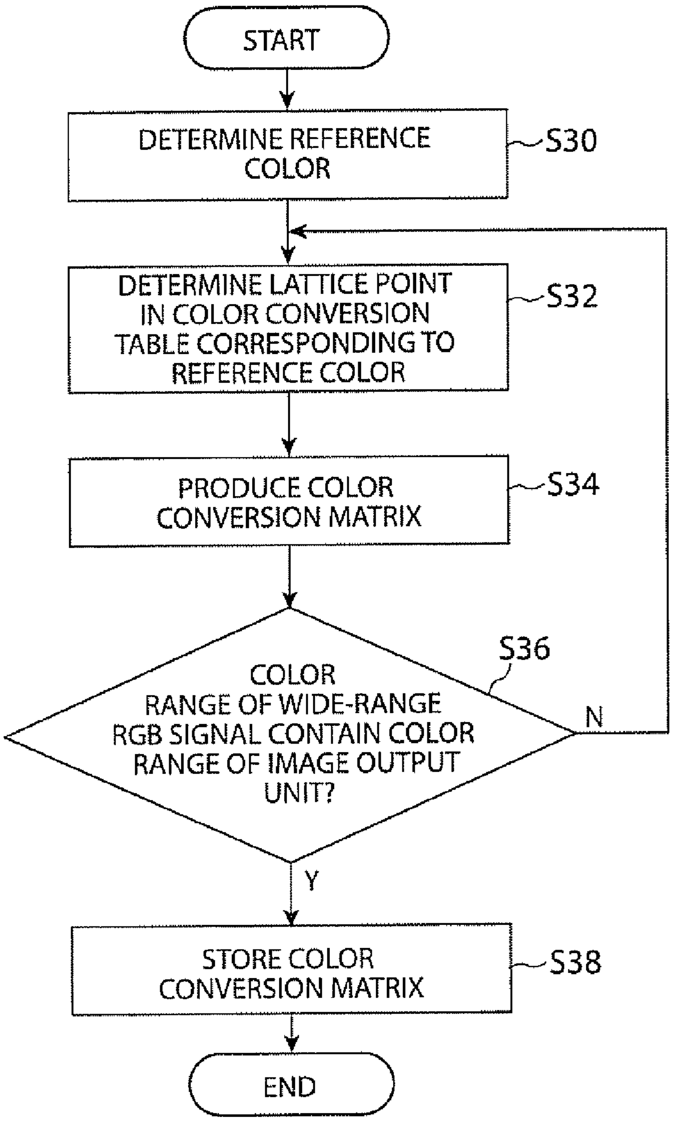
FIG. 8 is a flowchart showing a process example performed by a color conversion matrix producing process in step S12 shown in FIG. 7.

FIG. 8 is a flowchart showing a process example of the color conversion matrix producing process in step S12 shown in FIG. 7.

The ROM 220 shown in FIG. 6 stores a program for performing the process shown in FIG. 8 in advance. The CPU 200 reads the program stored in the ROM 220 and performs the process according to the program to execute the process shown in FIG. 8 by software processing.

Initially, the color conversion matrix producing unit 42 selects three reference colors requiring high color conversion accuracy from the input image signal from the not-shown image signal generating device by the reference color selecting unit 60 (step S30). For example, the reference color selecting unit 60 selects three primary colors (three primary colors of sRGB) as the reference color when the YCC signal as input image signal is converted into the RGB signal according to video signal standards ITU-R (international telecommunication union-radio communication sector) BT. 709.

Then, the color conversion matrix producing unit 42 determines the wide-range RGB signal corresponding to the reference color selected in step S30 by the matrix producing unit 62 (step S32). More specifically, the matrix producing unit 62 selects the wide-range RGB signal corresponding to each reference color selected in step S30 from the wide-range RGB signals corresponding to the coordinates at the lattice points in the color conversion table referred to by the second color conversion unit 24.

Subsequently, the color conversion matrix producing unit 42 produces color conversion matrix $M_{YCC \to R'G'B'}$ for converting the input image signal into the wide-range RGB signal according to the following equation (1) by the matrix producing unit 62 (step S34).

$$M_{YCC\to R'G'B'} = \begin{pmatrix} R_1' & R_2' & R_3' \\ G_1' & G_2' & G_3' \\ B_1' & B_2' & B_3' \end{pmatrix} \begin{pmatrix} Y_1 & Y_2 & Y_3 \\ C_{b1} & C_{b2} & C_{b3} \\ C_{r1} & C_{r2} & C_{r3} \end{pmatrix}^{-1} \quad (1)$$

In the above equation, Yi, Cbi, Cri (i=1, 2, 3) are YCC signals of reference color, in which: Yi is a luminance component signal; and Cbi and Cri are color difference component signals. Also, Ri', Gi', and Bi' (i=1, 2, 3) are wide-range RGB signals corresponding to the reference color, in which. Ri' is R component image signal, Gi' is a G component image signal; and Bi' is a B component image signal.

In the equation (1), the color conversion matrix $M_{YCC \to R'G'B'}$ is expressed in the following equation (2) when three primary colors in the conversion of the YCC signal into the RGB signal according to video signal standards ITU-R BT. 709 are selected as reference color as in step S30.

$$M_{YCC\to R'G'B'} = \begin{pmatrix} R_1' & R_2' & R_3' \\ G_1' & G_2' & G_3' \\ B_1' & B_2' & B_3' \end{pmatrix} \begin{pmatrix} 1 & 0 & 0 \\ 0 & 1 & 0 \\ 0 & 0 & 1 \end{pmatrix} M_{BT709RGB\to YCC}^{-1} \quad (2)$$

In the above equation, the matrix $M_{BT709RGB \to YCC}$ is conversion matrix for converting the RGB signal into the YCC signal, and specified according to the video signal standards ITU-R BT. 709.

Then, the color conversion matrix producing unit 42 determines whether the color range of the wide-range RGB signal defined in steps S32 and S34 contains the color range of the image output unit 90 by the color space determining unit 64 (step S36). This step is required since the wide-range RGB signal after conversion is out of the color range of the image output unit 90 and difficult to accurately reproduce color in some cases depending on the color conversion matrix $M_{YCC \to R'G'B'}$ calculated as above. In this embodiment, therefore, accurate color reproduction is securely achieved by determination of the color space using the color space determining unit 64.

When the color space determining unit 64 determines that the color range of the wide-range RGB signal does not contain the color range of the image output unit 90 in step S36 (step S36: N), the process returns to step S32 where the matrix producing unit 62 again selects another wide-range RGB signal corresponding to the reference color. In this case, it is preferable to decrease the element value of the diagonal component in the matrix for representing the wide-range RGB signal at three points in the equation (1) and separate the decreased amount of the element value of the diagonal component as non-diagonal component element so as to again determine another wide-range RGB signal. By this method, the color range of the wide-range RGB signal as the next selection target is narrowed, and the color range of the image output unit 90 is contained in the color range of the wide-range RGB signal having the widest possible range.

When the color space determining unit 64 determines that the color range of the wide-range RGB signal contains the color range of the image output unit 90 in step S36 (step S36: Y), the color conversion matrix storing unit 26 stores the color conversion matrix produced in step S34 (step S38), and a series of the processing ends (end).

The color space determining unit 64 performing the determining process discussed above calculates xy chromaticity in the three primary color XYZ color specification system of the wide-range RGB signal and xy chromaticity in the three primary color XYZ color specification system of the image output unit 90, and determines based on the inclusion relationship between both the xy chromaticities in the xy chromaticity figure. The three primary color xy chromaticity of the wide-range RGB signal is calculated by the following equations (3) through (5). The three primary color xy chromaticity of the image output unit 90 is calculated based on the color characteristics data stored in the image output unit color characteristics storing unit 50 in step S10 of FIG. 7.

$$\begin{pmatrix} R_{R'} & R_{G'} & R_{B'} \\ G_{R'} & G_{G'} & G_{B'} \\ B_{R'} & B_{G'} & B_{B'} \end{pmatrix} = M_{BT709YCC\to RGB} M_{YCC\to R'G'B'}^{-1} \begin{pmatrix} 1 & 0 & 0 \\ 0 & 1 & 0 \\ 0 & 0 & 1 \end{pmatrix} \quad (3)$$

$$\left.\begin{aligned} \begin{pmatrix} X_{R'} & X_{G'} & X_{B'} \\ Y_{R'} & Y_{G'} & Y_{B'} \\ Z_{R'} & Z_{G'} & Z_{B'} \end{pmatrix} &= M_{sRGB\to XYZ} \begin{pmatrix} r_{R'} & r_{G'} & r_{B'} \\ g_{R'} & g_{G'} & g_{B'} \\ b_{R'} & b_{G'} & b_{B'} \end{pmatrix} \\ r_C &= R_C^{2.2} (R_C \ge 0) \\ r_C &= -|R_C|^{2.2} (R_C < 0) \\ (C &= R', G', B') \end{aligned}\right\} \quad (4)$$

$$\left.\begin{aligned} x_C &= \frac{X_C}{(X_C + Y_C + Z_C)} \\ y_C &= \frac{Y_C}{(X_C + Y_C + Z_C)} \end{aligned}\right\} \quad (5)$$

In the equation (3), the matrix $M_{BT709YCC \to RGB}$ is the conversion matrix for conversion from YCC signal to RGB signal as a reverse matrix of the matrix $M_{BT709RGB \to YCC}$ in equation (2). In the equation (4), the matrix $M_{SRGB \to YCC}$ is the conversion matrix from the sRGB signal to the three stimulus value (X, Y, Z), and is specified according to the video signal standards ITU-R BT. 709. The equation (4) represents the equation for converting the RGB signal after gamma conversion into the three stimulus value (X, Y, Z). In the equation (4), only $r_C$ (C=R', G', B') is shown, but $g_C$ and $b_C$ are similarly expressed. The equation (5) represents the equation for calculating the xy chromaticity in the XYZ color specification system.

Figure 9:
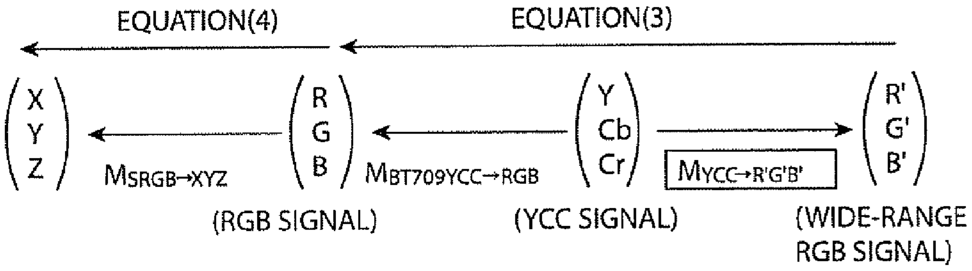
FIG. 9 illustrates operation of a matrix producing unit in step S36 shown in FIG. 8.

FIG. 9 illustrates operation of the matrix producing unit 62 in step S36 shown in FIG. 8.

As shown in FIG. 9, the equation (3) performs the process for converting the three primary colors of the wide-range RGB signal into the YCC signal and then converting the YCC signal into the RGB signal to determine whether the color conversion matrix $M_{YCC \to R'G'B'}$ for converting the YCC signal (Y, Cb, Cr) inputted as the input image signal into the wide-range RGB signal (R', G', B') is the desired color conversion matrix or not. The equation (4) performs the process for converting the RGB signal converted according to the equation (3) into the three stimulus value (X, Y, Z). After conversion into the three stimulus value (X, Y, Z), the xy chromaticity is calculated according to the equation (5).

Figure 10A:
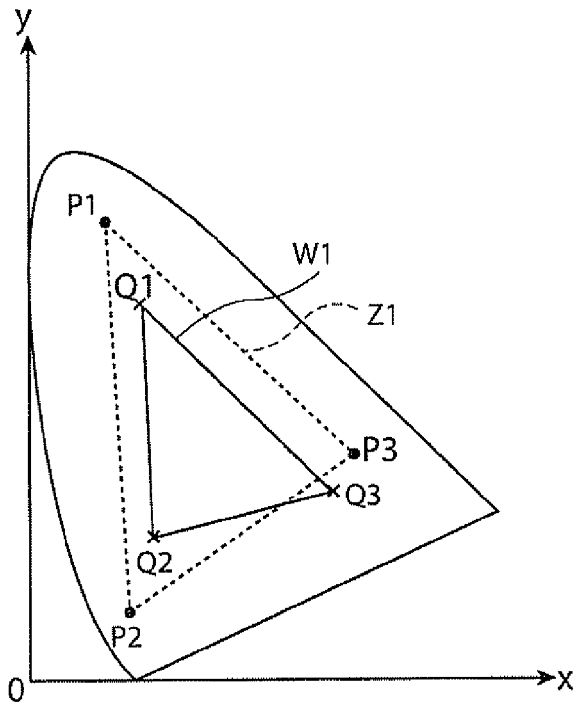
FIGS. 10A and 10B illustrate operation of a color space determining unit in step S36 shown in FIG. 8.
Figure 10B:
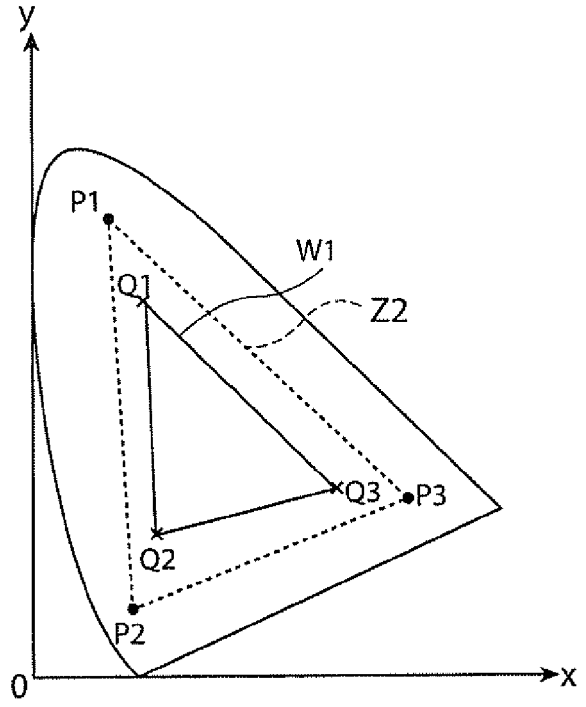

FIGS. 10A and 10B illustrate operation of the color space determining unit 64 in step S36 shown in FIG. 8. FIGS. 10A and 10B show xy chromaticity figure in XYZ color specification system.

In FIGS. 10A and 10B, P1 through P3 represent the three primary color xy chromaticity of the wide-range RGB signal, and the ranges surrounded by P1 through P3 become color ranges Z1 and Z2 of the wide-range RGB signal. Also, Q1 through Q3 represent three primary color xy chromaticity of the image output unit 90, and the range surrounded by Q1 through Q3 becomes a color range W1 of the image output unit 90.

In FIG. 10A, the color range Z1 does not contain the color range W1. Thus, the color space determining unit 64 determines that the color range of the wide-range RGB signal does not contain the color range of the image output unit 90 in step S36 shown in FIG. 8. In FIG. 10B, the color range Z1 contains the color range W1. Thus, the color space determining unit 64 determines that the color range of the wide-range RGB signal contains the color range of the image output unit 90 in step S36 shown in FIG. 8.

As described above, the color conversion matrix producing unit 42 according to this embodiment selects image signals corresponding to the reference colors stored at the lattice points in the color conversion table, and produces the color conversion matrix such that the color range of the selected image signal contains the color range of the second color space. More specifically, the color conversion matrix producing unit 42 selects image signals corresponding to the reference colors stored at the lattice points in the color conversion table, and repeats selection of image signals corresponding to the reference colors stored at the lattice points in the color conversion table until the color range of the selected image signal contains the color range of the second color space to produce the color conversion matrix.

Figure 11:
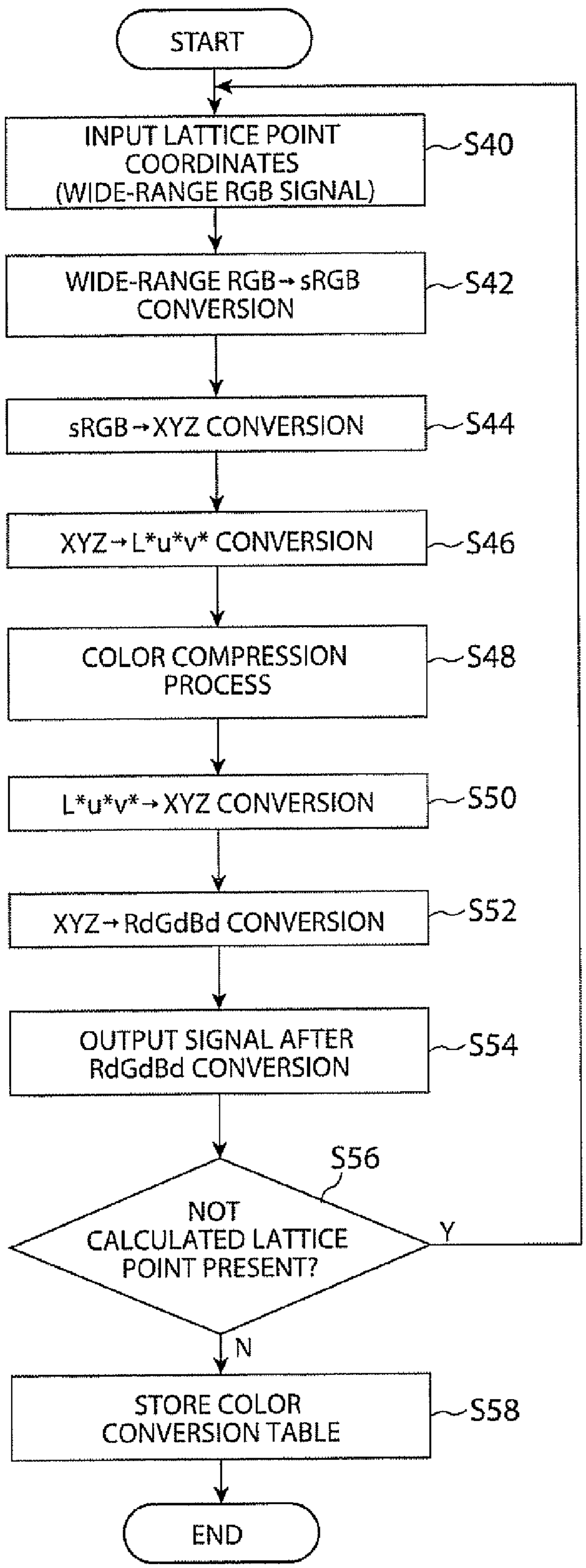
FIG. 11 is a flowchart showing a process example of a color conversion table producing process in step S14 shown in FIG. 7.

FIG. 11 is a flowchart showing a process example of the color conversion table producing process in step S14 shown in FIG. 7.

The ROM 220 shown in FIG. 6 stores a program for performing the process shown in FIG. 11 in advance. The CPU 200 reads the program stored in the ROM 220 and performs the process according to the program to execute the process shown in FIG. 11 by software processing.

Initially the color conversion table producing unit 44 obtains the value of the wide-range RGB signal as one coordinate value (R', G', B') at a lattice point in the color conversion table (step S40). Then, the color conversion table producing unit 44 converts the wide-range RGB signal as the coordinate value (R', G', B') obtained in step S40 into the RGB signal in the sRGB color space according to the equation (6) (step S42).

$$\begin{pmatrix} R \\ G \\ B \end{pmatrix} = M_{BT709YCC\to RGB} M^{-1}_{YCC\to R'G'B'} \begin{pmatrix} R' \\ G' \\ B' \end{pmatrix} \tag{6}$$

In this step, there is a possibility that the color corresponding to the RGB signal in the sRGB color space produced by converting the wide-range RGB signal as one coordinate value (R', G', B') at the lattice point in the color conversion table does not exist within the color range of the image output unit 90. In this embodiment, therefore, the color conversion table producing unit 44 performs color compression process for allocating the color corresponding to the RGB signal in the sRGB color space produced by converting the wide-range RGB signal to a color within the color range of the image output unit 90. In this embodiment, the RGB signal in the sRGB color space converted in step S42 is converted into a color L*u*v* in a CIELUV color space (CIE1976 L*u*v* color space) to prevent deterioration of the image quality after color compression, and then the color compression is executed in the CIELUV color space.

Thus, the color conversion table producing unit 44 converts the RGB signal in the sRGB color space obtained in step S42 into the three stimulus value (X, Y, Z) according to the equation (7) (step S44).

$$\left.\begin{array}{c} \begin{pmatrix} X \\ Y \\ Z \end{pmatrix} = M_{sRGB\to XYZ} \begin{pmatrix} r \\ g \\ b \end{pmatrix} \\ r = R^{2.2} (R \geq 0) \\ r = -|R|^{2.2} (R < 0) \end{array}\right\} \tag{7}$$

The equation (7) represents the equation for converting the RGB signal after gamma conversion into three stimulus value (X, Y, Z). Though the equation (7) shows only value r, values g and b are similarly expressed.

Then, the color conversion table producing unit 44 converts the three stimulus value (X, Y, Z) obtained in step S44 into the value L*u*v* in the CIELUV color space (step S46). The color conversion table producing unit 44 performs the conversion process in step S46 according to equations (8) through (11).

$$\left.\begin{array}{l} u'_W = 4X_W / (X_W + 15Y_W + 3Z_W) \\ v'_W = 9Y_W / (X_W + 15Y_W + 3Z_W) \end{array}\right\} \tag{8}$$

$$\left.\begin{array}{l} u' = 4X / (X + 15Y + 3Z) \\ v' = 9Y / (X + 15Y + 3Z) \end{array}\right\} \tag{9}$$

$$L^* = \left\{\begin{array}{ll} 903.3(Y/Y_W) & (Y/Y_W \leq 0.008856) \\ 116(Y/Y_W)^{1/3} - 16 & (Y/Y_W > 0.008856) \end{array}\right\} \tag{10}$$

$$\left.\begin{array}{l} u^* = 13L^* \times (u' - u'_W) \\ v^* = 13L^* \times (v' - v'_W) \end{array}\right\} \tag{11}$$

In equation (8), $X_W$, $Y_W$, and $Z_W$ correspond to three stimulus values X, Y, and Z of white in the CIELUV color space as the target color space.

Thereafter, the color conversion table producing unit 44 performs color compression process using the value L*u*v* in the CIELUV color space converted in step S46 (step S48).

Figure 12:
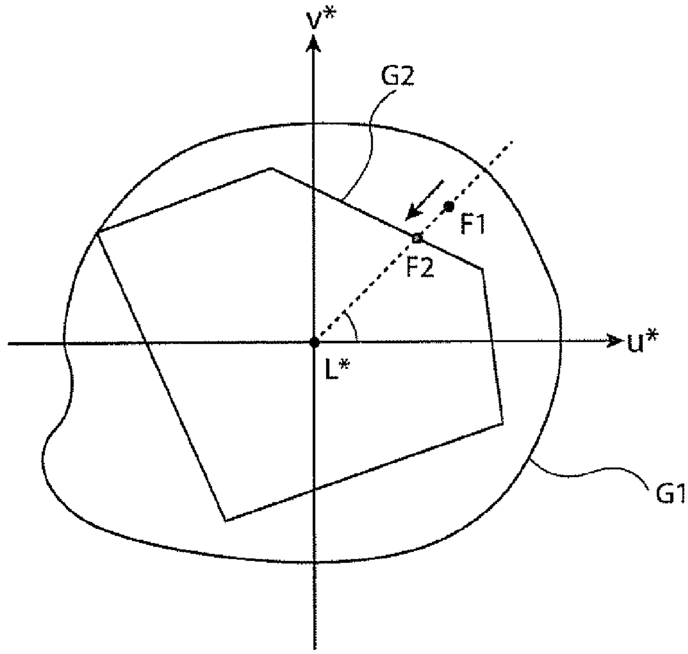
FIG. 12 illustrates operation of a color compression process in step S48 shown in FIG. 11.

FIG. 12 shows operation of the color compression process in step S48 shown in FIG. 11. In FIG. 12, the horizontal axis represents u*, the vertical axis represents v*, and L* axis is positioned at the cross point of the vertical axis and the horizontal axis. This figure shows allocation of color within the color range G1 of the wide-range RGB signal to color within the color range G2 of the image output unit 90.

As can be seen from FIG. 12, in case of conversion into a color F1 in the CIELUV color space by the conversion process in step S46, the color conversion table producing unit 44 performs color compression process for allocating the color F1 to a color F2 inside the color range G1 of the wide-range RGB signal. More specifically, the color conversion table producing unit 44 allocates the color F1 to the color F2 while maintaining hue with lowered saturation. By this method, the hue after color compression does not change. Thus, deterioration of the image quality after color compression does not become conspicuous.

The process in step S48 is not limited to the process shown in FIG. 12, but may be a process which allocates the color F1 to a color within the color range G2 of the image output unit 90 according to the distance from the center L* axis.

After color compression process in step S48 shown in FIG. 11, the color conversion table producing unit 44 converts the color L*u*v* in the CIELUV color space after the color compression process in step S48 into the three stimulus value (X, Y, Z) (step S50). More specifically, the color conversion table producing unit 44 converts the color L*u*v* in the CIELUV color space into the three stimulus value (X, Y, Z) according to equations (12) through (14).

$$\left.\begin{aligned} u' &= u'_W + u^*/13L^* \\ v' &= v'_W + v^*/13L^* \end{aligned}\right\} \tag{12}$$

$$Y = \left\{\begin{aligned} &Y_W \times (L^*/903.3) && (L^* \leq 8.0) \\ &Y_W \times ((L^*+16)/116)^3 - 16 && (L^* > 8.0) \end{aligned}\right\} \tag{13}$$

$$\left.\begin{aligned} X &= Y \times (9u'/4v') \\ Z &= Y \times ((36 - 9u' - 4v')/12v') \end{aligned}\right\} \tag{14}$$

Then, the color conversion table producing unit 44 converts the three stimulus value (X, Y, Z) of the color after the color compression process obtained in step S52 into an RGB signal ($R_d$, $G_d$, $B_d$) in the sRGB color space to be outputted from the image output unit 90 (step S52). More specifically, the color conversion table producing unit 44 converts the three stimulus value into the RGB signal in the sRGB color space ($R_d$, $G_d$, $B_d$) according to equation (15).

$$\left.\begin{aligned} \begin{pmatrix} r_d \\ g_d \\ b_d \end{pmatrix} &= M_{XYZ\rightarrow RGBd} \begin{pmatrix} X_d \\ Y_d \\ Z_d \end{pmatrix} \\ R_d &= r_d^{1/2.2} \\ G_d &= g_d^{1/2.2} \\ B_d &= b_d^{1/2.2} \end{aligned}\right\} \tag{15}$$

In equation (15), the three stimulus value ($X_d$, $Y_d$, $Z_d$) corresponds to the three stimulus value (X, Y, Z) obtained in step S50. Matrix $M_{XYZ\rightarrow RGBd}$ is matrix for converting the three stimulus value (X, Y, Z) into the RGB signal ($R_d$, $G_d$, $B_d$) of the image output unit 90 based on the color measurement data measured in step S10 shown in FIG. 7. Thus, the matrix $M_{XYZ\rightarrow RGBd}$ is obtained based on the color measurement data measured in step S10 shown in FIG. 7.

Then, the color conversion table producing unit 44 outputs the RGB signal after $R_d$, $G_d$, $B_d$ conversion obtained in step S52 as an output value from the color conversion table corresponding to the lattice point coordinates (R', G', B') (step S54).

When a lattice point not calculated in the lattice points in the color conversion table exists (step S56: Y), the color conversion table producing unit 44 returns to step S40. When any lattice point not calculated does not exist in the lattice points in the color conversion table (step S56: N), the output values obtained are all stored in the color conversion table storing unit 28 (step S58). Then, a series of processing ends (end). In step S58, it is preferable that the wide-range RGB signals and the output values obtained in step S54 are associated with one another before storing those in the color conversion table storing unit 28 as shown in FIG. 5B, for example.

According to this embodiment, therefore, the first color conversion unit 22 of the color conversion device 10 converts the image signal in the first color space by one-to-one correspondence conversion, and outputs the image signal in the third color space without decrease in accuracy of the image signal. Then, the second color conversion unit 24 converts the image signal in the third color space corresponding to the reference color in the first color space into the image signal in the second color space without interpolation, and converts the image signal in the third color space corresponding to color other than the reference color into the image signal in the second color space by interpolation in an appropriate manner. In this step, the first color conversion unit 22 can convert the image signal in the first color space into the image signal in the third color space such that the image signal in the first color space corresponding to the reference color can be converted into the image signal in the third color space at the lattice point in the color conversion table used by the second color conversion unit 24.

By this method, color conversion process can be performed with higher accuracy even when YCC signal containing color other than sRGB such as sYCC and xvYCC is inputted to the color conversion device 10. Moreover, interpolation is not required for color conversion for the reference color frequently used even when the data volume of the color conversion data stored in the color conversion table is small. Thus, accurate color conversion can be achieved.

2. Image Output Device

The color conversion device 10 according to this embodiment is applicable to an image output device described herein.

Figure 13:
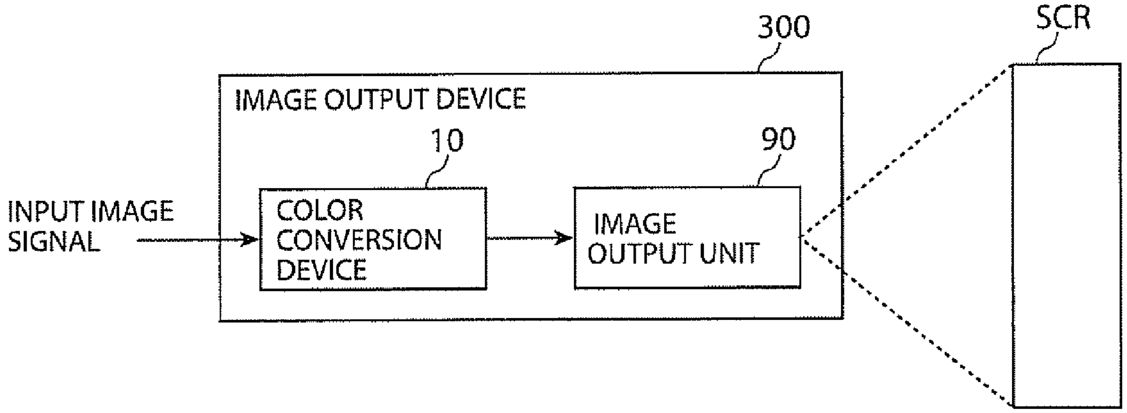
FIG. 13 is a block diagram showing a structure example of an image output device according to this embodiment.

FIG. 13 is a block diagram showing a structure example of the image output device according to the embodiment. In FIG. 13, similar reference numbers are given to parts similar to those shown in FIG. 1, and the same explanation is not repeated.

An image output device 300 in this embodiment includes the color conversion device 10 and the image output unit 90 described above. The image output unit 90 outputs images according to image signals after color conversion process performed by the color conversion device 10. As shown in FIG. 13, the image output unit 90 projects images corresponding to image signals to a screen SCR.

The image output unit 90 having this structure includes a light source, and modulates light emitted from the light source according to image signals to project modulated light to the screen SCR.

Figure 14:
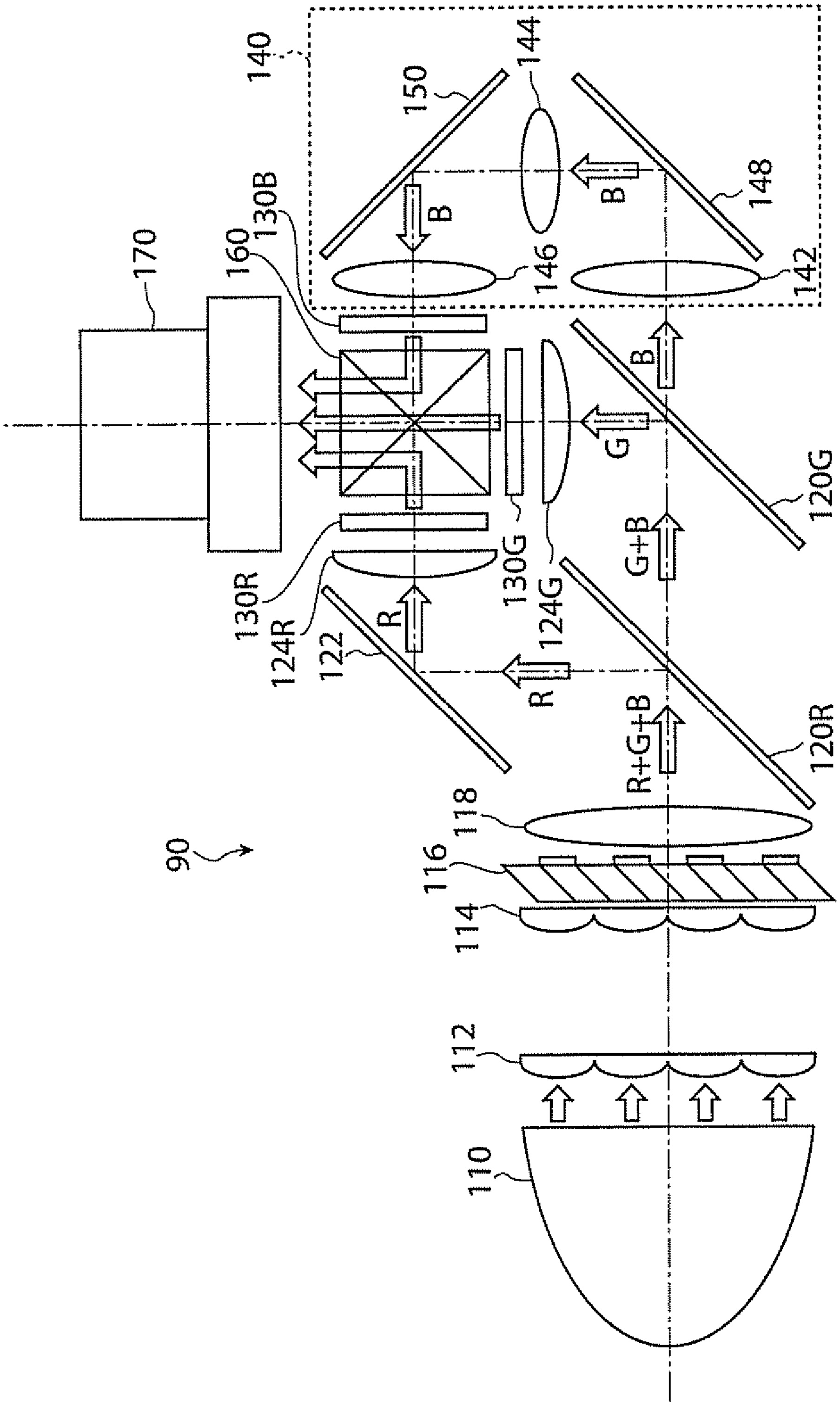
FIG. 14 illustrates a structure example of an image output unit 90 shown in FIG. 13.

FIG. 14 illustrates a structure example of the image output unit 90 shown in FIG. 13. In FIG. 14, the image output unit 90 is constituted by a so-called three-plate-type liquid crystal projector. However, the image output unit of the image output device according to the invention is not limited to the so-called three-plate-type liquid crystal projector.

The image output unit 90 includes a light source 110, integrator lenses 112 and 114, a polarization conversion element 116, a superimposing lens 118, an R light dichroic mirror 120R, a G light dichroic mirror 120G, a reflection mirror 122, an R light field lens 124R, a G light field lens 124G, an R light liquid crystal panel 130R (first light modulating unit), a G light liquid crystal panel 130G (second light modulating unit), a B light liquid crystal panel 130B (third light modulating unit), a relay system 140, a cross dichroic prism 160, and a projection lens 170. The liquid crystal panels used as the R light liquid crystal panel 130R, the G light liquid crystal panel 130G, and the B light liquid crystal panel 130B are transmission-type liquid crystal display units. The relay system 140 contains relay lenses 142, 144, and 146, and reflection mirrors 148 and 150.

The light source 110 is constituted by an extra-high pressure mercury lamp, for example, and emits light containing at least R component light, G component light, and B component light. The integrator lens 112 has a plurality of small lenses for dividing light emitted from the light source 110 into partial lights. The integrator lens 114 has a plurality of small lenses corresponding to the plural small lenses of the integrator lens 112. The superimposing lens 118 stacks partial lights released from the plural small lenses of the integrator lens 112.

The polarization conversion element 116 has a polarized light separating film and a λ/2 plate. The polarization conversion element 116 transmits p-polarized light and reflects s-polarized light, and also converts p-polarized light into s-polarized light. The s-polarized light from the polarization conversion element 116 is supplied to the superimposing lens 118.

The light stacked by the superimposing lens 118 enters the R light dichroic mirror 120R. The R light dichroic mirror 120 has function of reflecting R component light and transmits G component and B component lights. The light having passed the R light dichroic mirror 120R is supplied to the G light dichroic mirror 120G. The light reflected by the R light dichroic mirror 120R is reflected by the reflection mirror 122 and guided to the R light field lens 124R.

The G light dichroic mirror 120G has function of reflecting G component light and transmitting B component light. The light having passed the G light dichroic mirror 120G enters the relay system 140. The light reflected by the G light dichroic mirror 120G is guided to the G light field lens 124G.

The relay system 140 corrects the optical path length difference between the B component light having passed the G light dichroic mirror 120G and the other color lights of R and G component lights by using the relay lenses 142, 144 and 146 so as to reduce the optical path length difference between those lights as much as possible. The light having passed through the relay lens 142 is guided to the relay lens 144 by the reflection mirror 148. The light having passed through the relay lens 144 is guided to the relay lens 146 by the reflection mirror 150. The light having passed through the relay lens 146 is applied to the B light liquid crystal panel 130B.

Light supplied to the R light field lens 124R enters the R light liquid crystal panel 130R after converted into collimated light. The R light liquid crystal panel 130R functions as a light modulating element (light modulating unit) which changes transmission rate (passing rate, modulation rate) according to R light image signal. Thus, the light having entered the R light liquid crystal panel 130R (first color component light) is modulated according to the R light image signal, and the modulated light is supplied to the cross dichroic prism 160.

Light supplied to the G light field lens 124G enters the G light liquid crystal panel 130G after converted into collimated light. The G light liquid crystal panel 130G functions as a light modulating element (light modulating unit) which changes transmission rate (passing rate, modulation rate) according to G light image signal. Thus, the light having entered the G light liquid crystal panel 130G (second color component light) is modulated according to the G light image signal, and the modulated light is supplied to the cross dichroic prism 160.

The B light liquid crystal panel 130B to which the light converted into collimated light by the relay lenses 142, 144, and 146 is supplied functions as a light modulating element (light modulating unit) which changes transmission rate (passing rate, modulation rate) according to B light image signal. Thus, the light having entered the B light liquid crystal panel 130B (third color component light) is modulated according to the B light image signal, and the modulated light is supplied to the cross dichroic prism 160.

The R light liquid crystal panel 130R, the G light liquid crystal panel 130G, and the B light liquid crystal panel 130B have similar structures. Each of the liquid crystal panels has liquid crystals as electro-optic substances sealed between a pair of transparent glass substrates, and modulates passing rate of respective color lights according to image signals for respective pixels using polysilicon thin-film transistors as switching elements, for example.

The image signal after color conversion process performed by the color conversion device 10 controls the transmission rate (passing rate, modulation rate) of the R light liquid crystal panel 130R, the G light liquid crystal panel 130G, and the B light liquid crystal panel 130B.

The cross dichroic prism 160 has function of outputting light formed by combining lights from the R light liquid crystal panel 130R, the G light liquid crystal panel 130G, and the B light liquid crystal panel 130B as emission light. The projection lens 170 is a lens which enlarges and forms an output image on the screen SCR, and has function of expanding or contracting the image according to zoom magnification.

The image output device 300 having this structure according to this embodiment can achieve accurate color reproduction by performing accurate color conversion process even when an input image signal containing color out of the color range of the image output unit 90 such as sYCC and xvYCC is inputted. Moreover, the image output device 300 can achieve accurate color conversion for the reference color frequently used. Thus, the data volume of the color conversion table necessary for color conversion process can be decreased, and cost reduction can be achieved while preventing deterioration of image quality.

The invention is not limited to the color conversion device, the image output device, and the color conversion method according to the embodiment described and depicted herein. Thus, various modification and changes may be made without departing from the scope and spirit of the invention. For example, the following modification can be made.

(1) While the color conversion process and the color compression process are executed after conversion into the three stimulus value (X, Y, Z) and the CIELUV color space in this embodiment, the color space is not limited to the color space of the input image signal, the color space during conversion, nor the color space after conversion.

(2) While primary color in the sRGB color space has been used as the reference color in this embodiment, the reference color may be so-called memory colors (such as green of trees, blue of the sky, and skin color).

(3) While the projector which projects images has been discussed as an example of image output device in this embodiment, the image output device according to the invention may be a display apparatus which displays images or a printer which outputs images.

(4) While the light modulating unit is constituted by light valve in this embodiment, the light modulating unit may be DLP (registered trademark; digital light processing), LCOS (liquid crystal on silicon), or others.

(5) While the light modulating unit is constituted by a light valve using so-called three-plate type and transmission-type liquid crystal panel in this embodiment, a light valve using a transmission-type liquid crystal panel having four or more plates may be employed.

(6) While the invention has been applied to the color conversion device, the image output device, and the color conversion method in this embodiment, the invention is applicable to a program showing procedures of the color conversion method of the invention, and a recording medium on which the program is recorded.

What is claimed is:

1. A color conversion device, which converts an image signal in a first color space into an image signal in a second color space corresponding to an image output unit, comprising:

a color conversion table storing unit which stores a color conversion table, the color conversion table stores color conversion data used to convert an image signal in a third color space, corresponding to a plurality of lattice points into the image signal in the second color space;

a first color conversion unit which converts the image signal in the first color space into the image signal in the third color space with one-to-one correspondence;

a second color conversion unit which converts the image signal in the third color space into the image signal in the second color space based on the color conversion data stored in the color conversion table, wherein:

the first color conversion unit converts an image signal corresponding to a reference color in the first color space into an image signal corresponding to the lattice points in the third color space, the third color space having a color range containing a color range of the second color space, the image signal in the first color space is only received by the first color conversion unit prior to performing color conversion on the image signal in the first color space, the image signals not positioned at the lattice points are color-converted based on the color conversion data calculated by interpolation using color conversion data provided at the nearby lattice points, and the first color conversion unit converts the image signal in the first color space into the image signal in the third color space by matrix calculation using a color conversion matrix; and a color conversion matrix producing unit which produces the color conversion matrix, wherein:

the color conversion matrix producing unit selects the image signal corresponding to the reference color in the first color space which is stored in the color conversion table, and produces the color conversion matrix such that the color range of the third color space of the selected image signal contains the color range of the second color space, and the color conversion matrix producing unit repeats selection of the image signal corresponding to the reference color stored in the color conversion table and production of the color conversion matrix until the color range of the third color space of the selected image signal contains the color range of the second color space.

2. The color conversion device according to claim 1, wherein the reference color is a primary color in the first color space.

3. An image output device, comprising:

the color conversion device according to claim 1; and the image output unit which outputs an image according to an image signal after a color conversion process performed by the color conversion device.

4. A method converting an image signal in a first color space into an image signal in a second color space corresponding to an image output unit, comprising:

a first color conversion step in a first color conversion unit which converts the image signal in the first color space into an image signal in a third color space, with one-to-one correspondence, having a color range containing a color range of the second color space;

a second color conversion step in a second color conversion unit which converts the image signal in the third color space into the image signal in the second color space based on the color conversion data stored in the color conversion table used to convert the image signal in a third color space corresponding to a plurality of lattice points into the image signal in the second color space, wherein:

the first color conversion step converts an image signal corresponding to a reference color in the first color space into an image signal corresponding to the lattice points in the third color space, the image signal in the first color space is only received by the first color conversion unit prior to performing color conversion on the image signal in the first color space, the image signals not positioned at the lattice points are color-converted based on the color conversion data calculated by interpolation using color conversion data provided at the nearby lattice points, and the image signal in the first color space is converted into the image signal in the third color space by matrix calculation using a color conversion matrix; and a color conversion matrix producing step in a color conversion matrix producing unit which produces the color conversion matrix, wherein:

the image signal corresponding to the reference color in the first color space which is stored in the color conversion table is selected, and the color conversion matrix is produced such that the color range of the third color space of the selected image signal contains the color range of the second color space, and selection of the image signal corresponding to the reference color stored in the color conversion table is repeated and production of the color conversion matrix is repeated until the color range of the third color space of the selected image signal contains the color range of the second color space.

5. A color conversion device that converts an image signal in a first color space into an image signal in a second color space corresponding to an image output unit, the color conversion device comprising:

a first color conversion unit that converts the image signal in the first color space into an image signal in a third color space, with one-to-one correspondence, the image signal in the third color space having a color range containing a color range of the second color space;

a second color conversion unit that converts the image signal corresponding to a reference color in the first color space, the second color conversion unit converts the image signal in the third color space into the image signal in the second color space after the first color conversion unit converts the image signal in the first color space into the image signal in the third color space, wherein:

the image signal in the first color space is only received by the first color conversion unit prior to performing color conversion on the image signal in the first color space, the image signals not positioned at the lattice points are color-converted based on the color conversion data calculated by interpolation using color conversion data provided at the nearby lattice points, and the first color conversion unit converts the image signal in the first color space into the image signal in the third color space by matrix calculation using a color conversion matrix; and a color conversion matrix producing unit which produces the color conversion matrix, wherein:

the color conversion matrix producing unit selects the image signal corresponding to the reference color in the first color space which is stored in the color conversion table, and produces the color conversion matrix such that the color range of the third color space of the selected image signal contains the color range of the second color space, and the color conversion matrix producing unit repeats selection of the image signal corresponding to the reference color stored in the color conversion table and production of the color conversion matrix until the color range of the third color space of the selected image signal contains the color range of the second color space.

6. The color conversion device according to claim 5, wherein the image signal in the first color space corresponding to the reference color is converted into the image signal at lattice points in the third color space, and the image signal in the third color space is converted into the image signal in the second color space by the second color conversion unit based on color conversion data stored in a color conversion table.

7. A method of converting an image signal in a first color space into an image signal in a second color space corresponding to an image output unit, the method comprising:

converting the image signal in the first color space into an image signal in a third color space with one-to-one correspondence with a first color conversion unit, the image signal in the third color space having a color range containing a color range of the second color space;

converting the image signal in the third color space with a second color conversion unit, into the image signal in the second color space corresponding to a reference color in the first color space after the converting of the image signal in the first color space into the image signal in the third color space, wherein:

the image signal in the first color space is only received by the first color conversion unit prior to performing color conversion on the image signal in the first color space, the image signals not positioned at the lattice points are color-converted based on the color conversion data calculated by interpolation using color conversion data provided at the nearby lattice points, and the image signal in the first color space is converted into the image signal in the third color space by matrix calculation using a color conversion matrix; and producing the color conversion matrix in a color conversion matrix producing unit, wherein:

the image signal corresponding to the reference color in the first color space which is stored in the color conversion table is selected, and the color conversion matrix is produced such that the color range of the third color space of the selected image signal contains the color range of the second color space, and selection of the image signal corresponding to the reference color stored in the color conversion table is repeated and production of the color conversion matrix is repeated until the color range of the third color space of the selected image signal contains the color range of the second color space.

8. The method according to claim 7, further comprising:

converting the image signal in the first color space corresponding to the reference color into the image signal at lattice points in the third color space; and converting the image signal in the third color space into the image signal in the second color space based on color conversion data stored in a color conversion table.

* * * * *